(12) United States Patent
Fukuhara et al.

(10) Patent No.: US 8,231,805 B2
(45) Date of Patent: Jul. 31, 2012

(54) LIQUID CRYSTALLINE POLYESTER COMPOSITION FOR CONNECTOR AND CONNECTOR USING THE SAME

(75) Inventors: Yoshiyuki Fukuhara, Tsuchiura (JP); Hiroyasu Yamauchi, Tsukuba (JP)

(73) Assignee: Sumitomo Chemical Company, Limited, Tokyo (JP)

(*) Notice: Subject to any disclaimer, the term of this patent is extended or adjusted under 35 U.S.C. 154(b) by 0 days.

(21) Appl. No.: 12/945,339

(22) Filed: Nov. 12, 2010

(65) Prior Publication Data

US 2011/0114884 A1 May 19, 2011

(30) Foreign Application Priority Data

Nov. 16, 2009 (JP) .................................. 2009-260987

(51) Int. Cl.
- *C09K 19/38* (2006.01)
- *C09K 19/52* (2006.01)
- *C09K 19/54* (2006.01)
- *C08K 3/04* (2006.01)

(52) U.S. Cl. ............... 252/299.01; 252/299.5; 524/495; 524/496

(58) Field of Classification Search ............ 252/299.01, 252/299.66, 299.67, 299.5; 528/86, 125, 528/128, 176, 193, 194; 524/449, 495, 499, 524/496

See application file for complete search history.

(56) References Cited

U.S. PATENT DOCUMENTS

| | | | | |
|---|---|---|---|---|
| 5,352,746 | A * | 10/1994 | Asai et al. | 525/444 |
| 6,306,946 | B1 * | 10/2001 | Long et al. | 524/451 |
| 6,793,847 | B2 * | 9/2004 | Maeda et al. | 252/299.01 |
| 6,797,198 | B1 | 9/2004 | Miyashita et al. | |
| 7,789,670 | B2 * | 9/2010 | Fukatsu et al. | 439/66 |
| 7,842,760 | B2 * | 11/2010 | Yonezawa et al. | 525/450 |
| 8,142,683 | B2 * | 3/2012 | Murouchi et al. | 252/299.01 |
| 2009/0111964 | A1 * | 4/2009 | Asahara et al. | 528/128 |
| 2011/0089371 | A1 * | 4/2011 | Murouchi et al. | 252/299.01 |
| 2011/0114883 | A1 * | 5/2011 | Murouchi et al. | 252/299.6 |
| 2011/0189454 | A1 | 8/2011 | Fukuhara et al. | |

FOREIGN PATENT DOCUMENTS

| | | | |
|---|---|---|---|
| JP | 8325446 A | | 12/1996 |
| JP | 2005276758 A | | 10/2005 |
| JP | 2006274068 A | | 10/2006 |
| WO | WO 2009119863 A1 | * | 10/2009 |
| WO | WO 2009119864 A1 | * | 10/2009 |

* cited by examiner

*Primary Examiner* — Shean Wu
(74) *Attorney, Agent, or Firm* — Panitch Schwarze Belisario & Nadel LLP

(57) ABSTRACT

The present invention provides a liquid crystalline polyester composition comprising a liquid crystalline polyester, a fibrous filler, a plate-like filler and a granular filler. The connector obtained using the liquid crystalline polyester composition has poor filling suppressed and is excellent in warp resistance and crack resistance.

8 Claims, 2 Drawing Sheets

LIQUID CRYSTALLINE POLYESTER COMPOSITION FOR CONNECTOR AND CONNECTOR USING THE SAME

BACKGROUND OF THE INVENTION (1) Field of the Invention

The present invention relates to a technology which improves fluidity of a liquid crystalline polyester composition, and a technology which improves warp resistance and crack resistance of a connector formed by using the same.

(2) Description of Related Art

As a connector for electronic components, for example, a CPU socket is known. The CPU socket is a connector for detachably mounting a central processing unit (CPU) to an electronic circuit board. The CPU socket can be, for example, formed of a resin having excellent heat resistance.

As an electronic equipment with high performance has been developed, the scale of a circuit of CPU to be mounted on an electronic circuit board has increased. Generally, as the scale of CPU increases, the number of contact pins increases. Recently, CPU including about 700 to 1,000 contact pins has been known. The contact pins of CPU are disposed on a bottom face of CPU, for example, in a matrix form. A pitch of these contact pins tends to decrease as the number of the contact pins increases. Also, as the scale of IC increases, a calorific value tends to increase.

The CPU socket includes pin insertion holes corresponding to each contact pin of CPU. As the pitch of the contact pins decreases, the pitch of the pin insertion holes decreases and therefore, a width of a resin which partitions the pin insertion holes each other decreases. Therefore, in the CPU socket, as the number of the pin insertion holes increases, warp and crack are likely to be caused by reflow soldering or pin insertion.

Also, the CPU socket is generally produced by using an injection molding method. However, when the portion where the pin insertion holes are partitioned each other has a small width, partial poor filling (i.e., a phenomenon of lack of a filling amount of a resin) is likely to arise when a mold is filled with a resin. At the portion where poor filling occurred, a mechanical strength becomes insufficient. In order to suppress the occurrence of poor filling, it is necessary to sufficiently enhance fluidity of a resin composition.

A technology of suppressing warp and crack of the CPU socket or the other connector for electronic components is disclosed, for example, in JP-A-2005-276758, JP-A-8-325446, JP-A-2001-106923 and JP-A-2006-274068.

JP-A-2005-276758 discloses a CPU socket formed of a composition obtained by mixing a fibrous filler in a liquid crystalline polymer (see paragraph [0017] of JP-A-2005-276758). According to the technology of JP-A-2005-276758, an attempt is made to suppress warp of the CPU socket and to improve fluidity by using such a composition (see paragraph [0008] of JP-A-2005-276758).

JP-A-8-325446 discloses a connector formed of a composition obtained by filling a liquid crystalline polyester resin with glass beads (see paragraph [0006] of JP-A-8-325446). According to the technology of JP-A-8-325446, an attempt is made to improve a mechanical strength of the connector by using such a composition (see paragraph [0038] of JP-A-8-325446).

JP-A-2001-106923 discloses a connector formed of a composition obtained by mixing a plate-like filler with a liquid crystalline polymer or a composition obtained by mixing a plate-like filler and a fibrous filler with a liquid crystalline polymer (see paragraphs [0013] and [0018] of JP-A-2001-106923). According to the technology of JP-A-2001-106923, an attempt is made to suppress warp of the connector by mixing a plate-like filler and to improve a mechanical strength of the connector by mixing a fibrous filler (see paragraph [0013] and [0018] of JP-A-2001-106923).

JP-A-2006-274068 discloses a connector formed of a composition obtained by mixing a scaly reinforcer with a liquid crystalline resin or a composition obtained by mixing a scaly reinforcer and a fibrous reinforcer with a liquid crystalline resin (see paragraphs [0006] and [0008] of JP-A-2006-274068). According to the technology of JP-A-2006-274068, an attempt is made to suppress blister upon reflow soldering (see paragraph [0011] of JP-A-2006-274068).

However, when a CPU socket includes quite a lot of pin insertion holes (therefore, when a resin which partitions pin insertion holes is very fine), it was impossible to sufficiently suppress warp, crack and poor filling even in the case of using the above technologies of JP-A-2005-276758, JP-A-8-325446, JP-A-2001-106923 and JP-A-2006-274068.

On the other hand, when a liquid crystalline polymer was allowed to contain only a fibrous filler, a liquid composition did not have sufficient fluidity, and poor filling was likely to occur.

Also, when a liquid crystalline polymer was allowed to contain only a plate-like filler, although poor filling was less likely to occur, shrinkage was likely to occur, and thus warp and crack were likely to occur.

Furthermore, when a liquid crystalline polymer was allowed to contain both a fibrous filler and a plate-like filler, although the occurrence of poor filling and warp is suppressed, crack was likely to occur.

SUMMARY OF THE INVENTION

One of objective of the present invention is to produce a connector which is excellent in warp resistance and crack resistance, and has a reduced poor filling.

In order to achieve such an object, the present inventors have studied about the composition for producing connectors, and thus the present invention has been completed.

The present invention provides a liquid crystalline polyester composition comprising a liquid crystalline polyester, a fibrous filler, a plate-like filler and a granular filler. Also, the present invention provides a connector for mounting an electronic component, which can be produced using the liquid crystalline polyester composition described above.

According to the present invention, it is possible to produce a connector which is excellent in warp resistance and crack resistance, and has a reduced poor filling.

The connector obtained using the liquid crystalline polyester composition of the present invention has poor filling suppressed, and also is excellent in warp resistance and crack resistance.

BRIEF DESCRIPTION OF THE DRAWINGS

FIG. 1A is a plan view of the connector structure, and FIG. 1B is a sectional view taken along lines A-A of FIG. 1A.

DETAILED DESCRIPTION OF PREFERRED EMBODIMENTS

An embodiment of the present invention will be described below by means of the case where a connector is a CPU socket with reference to FIG. 1A, FIG. 1B and FIG. 2.

Figure 1A:
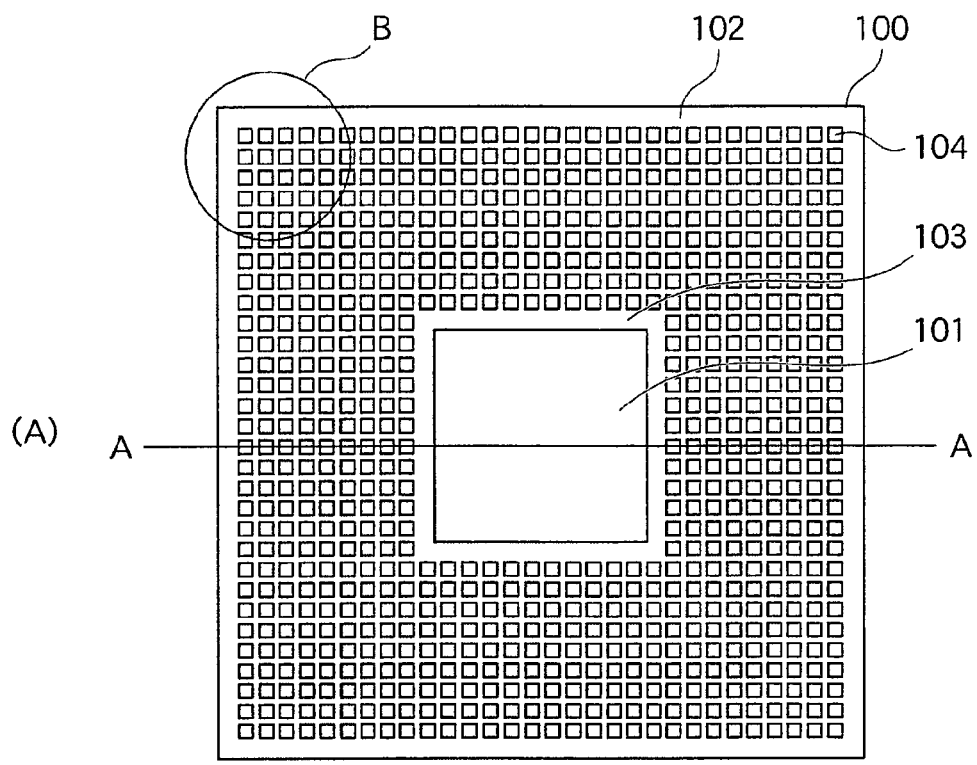
FIGS. 1A and 1B show a structure of a connector according to the present embodiment. Specifically.
Figure 1B:
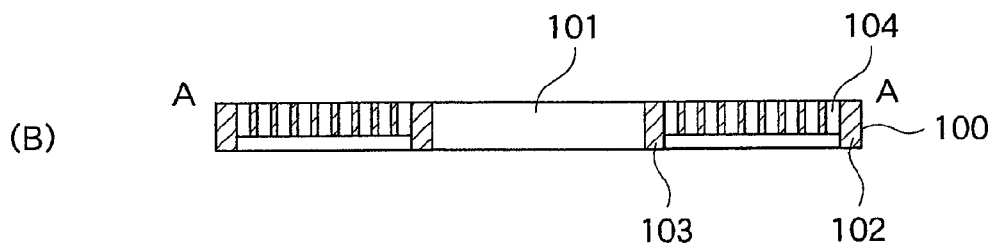

FIGS. 1A and 1B show a structure of a connector according to the present embodiment. Specifically, FIG. 1A is a plan view of the connector structure, and FIG. 1B is a sectional view taken along lines A-A of FIG. 1A. FIG. 2 is an enlarged view of a portion indicated by the circle "B" in FIG. 1A.

Figure 2:
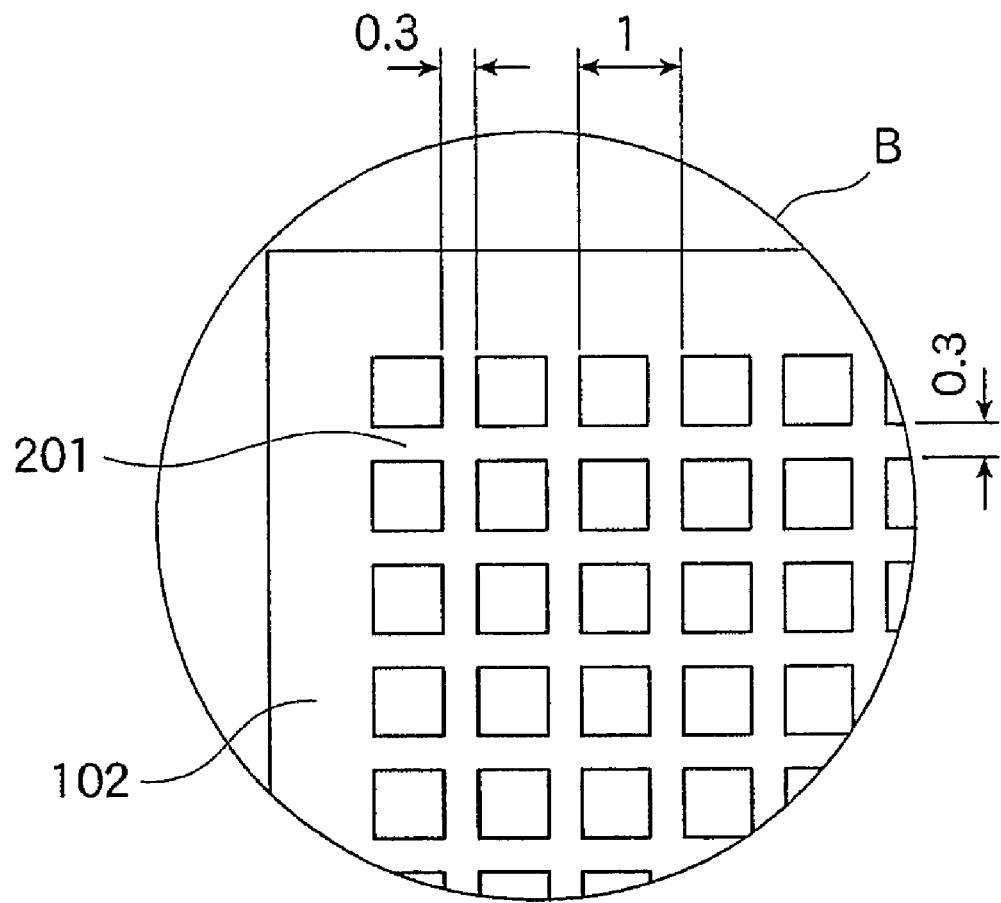
FIG. 2 is a partially enlarged view of FIG. 1A.

As shown in FIG. 1 and FIG. 2, a connector 100 of the present embodiment has a plate-shaped square plane, and includes a square opening 101 in the center. Back sides of an outer peripheral portion and an inner peripheral portion of the connector 100 are formed in a convex shape to form an outer frame portion 102 and an inner frame portion 103. In an area surrounded by the outer frame portion 102 and the inner frame portion 103, 794 pin insertion holes 104 are formed in a matrix form. The pin insertion holes 104 are formed so that a horizontal section becomes square. As a result, the shape of the portion which partitions the pin insertion holes 104 each other, i.e., a minimum thickness portion 201 becomes entirely a lattice shape.

The connector 100 has an external dimension of 42 mm×42 mm and the opening 101 has a dimension of 14 mm×14 mm. The thickness of the connector 100 is 4 mm at the outer frame portion 102 and the inner frame portion 103, or 3 mm in the area surrounded by these frame portions 102, 103. The pin insertion hole 104 has a dimension of 0.7 mm×0.7 mm and a pitch of 1 mm. The minimum thickness portion 201 has a thickness of 0.3 mm.

In the present embodiment, such a connector is produced by an injection molding method using a liquid crystalline polyester composition comprising a liquid crystalline polyester, a fibrous filler, a plate-like filler and a granular filler. The connector can be used as a connector for mounting an electronic component.

<Liquid Crystalline Polyester>

The connector in the present embodiment is produced by a liquid crystalline polyester composition comprising a liquid crystalline polyester, a fibrous filler, a plate-like filler and a granular filler. In the present embodiment, a thermotropic liquid crystalline polymer can be used as a liquid crystalline polyester resin. The thermotropic liquid crystalline polymer may be obtained by forming an anisotropic melt at a temperature of 400° C. or lower, and suitably polymerizing an aromatic hydroxycarboxylic acid, an aromatic dicarboxylic acid and an aromatic diol.

In order to prepare a liquid crystalline polyester more easily, it is also possible to polymerize after converting a portion of raw monomers such as an aromatic hydroxycarboxylic acid, an aromatic dicarboxylic acid and an aromatic diol into an ester-forming derivative.

Examples of the ester-forming derivative can include the followings.

Examples of the ester-forming derivative can include those having carboxyl groups in a molecule, such as an aromatic hydroxycarboxylic acid and an aromatic dicarboxylic acid. Examples of the ester-forming derivative include those in which carboxyl groups have been converted into groups such as a highly reactive acid halogen group and an acid anhydride group, and those in which carboxyl groups are converted into esters capable of producing a polyester by an ester exchange reaction.

Examples of the ester-forming derivative can also include those having phenolic hydroxyl groups, such as an aromatic hydroxycarboxylic acid and an aromatic diol. Such an ester-forming derivative includes those in which the production of a polyester by an ester exchange reaction is performed by converting phenolic hydroxyl groups into esters.

A method of producing a liquid crystalline polyester using such an ester-forming derivative will be described below.

Specific examples of a structural unit of the liquid crystalline polyester according to the present embodiment will be described.

Examples of a structural unit derived from the aromatic hydroxycarboxylic acid are as follows. As described below, in the present embodiment, the case of using structural units $(A_1)$ and $(A_2)$ will be described.

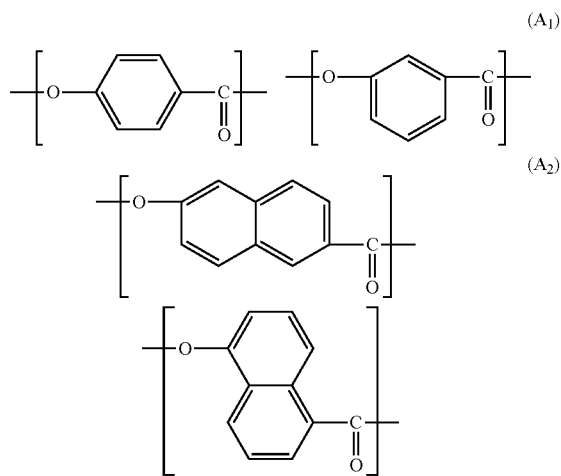

In these structural units, a portion of hydrogen atoms in an aromatic ring may be substituted with a substituent selected from a halogen atom, an alkyl group and an aryl group.

Examples of a structural unit derived from the aromatic dicarboxylic acid are as follows. As described below, in the present embodiment, the case of using structural units $(B_1)$, $(B_2)$ and $(B_3)$ will be described.

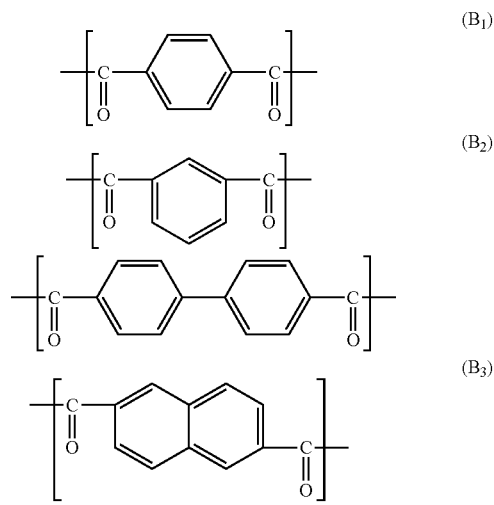

In these structural units, a portion of hydrogen atoms in an aromatic ring may be substituted with a substituent selected from a halogen atom, an alkyl group and an aryl group.

Examples of a structural unit derived from the aromatic diol are as follows. As described below, in the present embodiment, the case of using structural units $(C_1)$, $(C_2)$ and $(C_3)$ will be described.

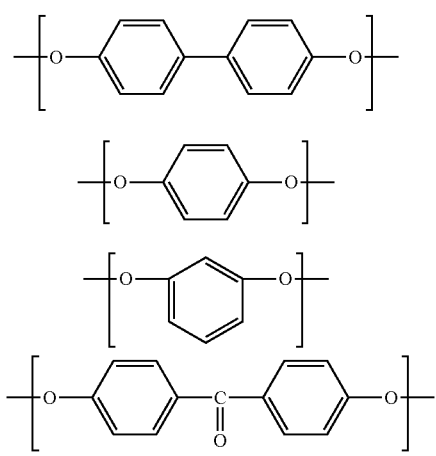

In these structural units, a portion of hydrogen atoms in an aromatic ring may be substituted with a substituent selected from a halogen atom, an alkyl group and an aryl group.

These structural units may have, as the substituent of the halogen atom, a fluorine atom, a chlorine atom or a bromine atom. These structural units may have, as the substituent of the alkyl group, a lower alkyl group having about 1 to 4 carbon atoms, such as a methyl group, an ethyl group and a butyl group. These structural units may have, as the substituent of the aryl group, a phenyl group.

Suitable combination of the above structural units will be described below.

In the present embodiment, it is desired that the structural units of the liquid crystalline polyester be used according to any of the following combinations [a] to [f]:

[a] A Combination of at least one selected from ($A_1$) and ($A_2$), at least one selected from ($B_1$) and ($B_2$) and at least one selected from ($C_1$) and ($C_2$),

[b] A Combination of ($A_1$) and ($A_2$),

[c] A Combination [a] in which a portion of ($B_1$) or ($B_2$) is replaced with ($B_3$), and

[d] A Combination [a] in which a portion of ($C_1$) or ($C_2$) is replaced with ($C_3$).

Particularly preferred are the liquid crystalline polyester which are composed of a combination of a structural unit derived from parahydroxybenzoic acid and/or a structural unit derived from 6-hydroxy-2-naphthoic acid (corresponding to the structural unit ($A_1$) and/or the structural unit ($A_2$)); a structural unit derived from 4,4'-dihydroxybiphenyl and/or a structural unit derived from hydroquinone (corresponding to the structural unit ($C_1$) and/or the structural unit ($C_2$)); and a structural unit derived from terephthalic acid and/or a structural unit derived from isophthalic acid (corresponding to the structural units ($B_1$) and/or ($B_2$)), as the combination [a], among these combinations [a] to [d]. Furthermore, in this combination, a molar ratio $[(C_1)+(C_2)]/[(A_1)+(A_2)]$ is preferably adjusted to 0.2 or more and 1.0 or less, and a molar ratio $[(B_1)+(B_2)]/[(C_1)+(C_2)]$ is preferably adjusted to 0.9 or more and 1.1 or less. In addition, a molar ratio $(B_2)/(B_1)$ is preferably adjusted to more than 0 and 1 or less, and more preferably more than 0 and 0.3 or less; and a molar ratio $(C_2)/(C_1)$ is preferably adjusted to more than 0 and 1 or less, and more preferably more than 0 and 0.3 or less.

Preferably, the liquid crystalline polyester having 30% by mol or more of the entire liquid crystalline is utilized. Namely, in the combinations [a] to [d], the structural unit $A_1$ preferably accounts for 30% by mol or more of the entire liquid crystalline polyester.

<Method of Producing Liquid Crystalline Polyester>

An example of the method of producing a liquid crystalline polyester according to the present embodiment will be described below.

It is preferred that the liquid crystalline polyester of the present embodiment be produced by the following acylation and polymerization steps.

(Acylation step): An acylate (i.e., an aromatic diol acylate and an aromatic hydroxycarboxylic acid acylate) is obtained by acylating phenolic hydroxyl groups of an aromatic diol and an aromatic hydroxycarboxylic acid with a fatty acid anhydride (for example, acetic anhydride).

(Polymerization step): A liquid crystalline polyester is obtained by polymerizing acyl groups of the acylate obtained in the acylation step with carboxyl groups of an acrylate of an aromatic dicarboxylic acid and an aromatic hydroxycarboxylic acid so as to cause ester exchange.

The acylation step and the polymerization step may be conducted in the presence of a heterocyclic organic base compound shown below.

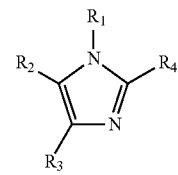

In this structural formula, $R_1$ to $R_4$ each independently represents a hydrogen atom, an alkyl group having 1 to 4 carbon atoms, a hydroxymethyl group, a cyano group, a cyanoalkyl group in which an alkyl group has 1 to 4 carbon atoms, a cyanoalkoxy group in which an alkoxy group has 1 to 4 carbon atoms, a carboxyl group, an amino group, an aminoalkyl group having 1 to 4 carbon atoms, an aminoalkoxy group having 1 to 4 carbon atoms, a phenyl group, a benzyl group, a phenylpropyl group or a formyl group.

Among the heterocyclic organic base compound of the above formula, 1-methylimidazole and/or 1-ethylimidazole are particularly preferred from the viewpoint of ease of availability.

The use amount of the heterocyclic organic base compound is preferably adjusted within a range from 0.005 to 1 part by mass when the total amount of raw monomers (i.e., an aromatic dicarboxylic acid, an aromatic diol and an aromatic hydroxycarboxylic acid) of the liquid crystalline polyester is 100 parts by mass. From the viewpoints of color tone and productivity of a molded body (connector in this embodiment), the amount is more preferably adjusted within a range from 0.05 to 0.5 parts by mass based on 100 parts by mass of raw monomers. Such a heterocyclic organic base compound may be temporarily present in the case of an acylation reaction and an ester exchange reaction, and may be added immediately before initiation of the acylation reaction, during the acylation reaction, or between the acylation reaction and the ester exchange reaction. The liquid crystalline polyester thus obtained has an advantage such as very high melt fluidity.

The use amount of the fatty acid anhydride (for example, acetic anhydride) must be determined taking the use amount of raw monomers such as an aromatic diol and/or an aromatic hydroxycarboxylic acid into consideration. Specifically, the amount is preferably adjusted within a range from 1.0- to 1.2-fold equivalent, more preferably from 1.0- to 1.15-fold equivalent, still more preferably from 1.03- to 1.12-fold equivalent, and particularly preferably from 1.05- to 1.1-fold equivalent, based on the total amount of phenolic hydroxyl groups contained in these raw monomers.

The acylation reaction in the acylation step is preferably conducted at a temperature within a range from 130° C. to 180° C. for 30 minutes to 20 hours, and more preferably conducted at a temperature within a range from 140° C. to 160° C. for 1 to 5 hours.

The aromatic dicarboxylic acid used in the polymerization step may be present in the reaction system upon the acylation step. Namely, in the acylation step, an aromatic diol, an aromatic hydroxycarboxylic acid and an aromatic dicarboxylic acid may be present in the same reaction system. This is because both carboxyl groups and optionally substituted substituents in the aromatic dicarboxylic acid are not influenced by a fatty acid anhydride. Therefore, it is possible to use a method in which the acylation step and the polymerization step are sequentially conducted after charging an aromatic diol, an aromatic hydroxycarboxylic acid and an aromatic dicarboxylic acid in a reactor, or a method in which an aromatic diol and an aromatic dicarboxylic acid are charged in a reactor and, after conducting the acylation step, an aromatic dicarboxylic acid is further charged in the reactor and the polymerization step is conducted. From the viewpoint of simplification of the production process, the former method is preferred.

The ester exchange reaction in the polymerization step is preferably conducted while heating from 130° C. to 400° C. at a temperature rise rate of 0.1 to 50° C./minute, and more preferably conducted while heating from 150° C. to 350° C. at a temperature rise rate of 0.3 to 5° C./minute.

When the ester exchange reaction of the polymerization step is conducted, a fatty acid produced as a by-product (for example, acetic acid) and the unreacted fatty acid anhydride (for example, acetic anhydride) are preferably distilled out of the system by evaporation so as to shift equilibrium. At this time, raw monomers evaporated and sublimated together with the fatty acid can also be returned to the reactor after condensation or anti-sublimation by refluxing a portion of the fatty acid distilled out and returning to the reactor.

In the acylation reaction of the acylation step and the ester exchange reaction of the polymerization step, a batch apparatus may be used or a continuous apparatus may be used as the reactor. It is possible to obtain a liquid crystalline polyester which can be used in the present invention, even if any of the reaction apparatuses is used.

After the polymerization step, a step of increasing a molecular weight of the liquid crystalline polyester obtained in the polymerization step may be conducted. For example, it is possible to increase the molecular weight when a powdered liquid crystalline polyester is prepared by cooling and crushing the liquid crystalline polyester obtained in the polymerization step, and then the powder is heated. It is also possible to increase the molecular weight by granulating a powdered liquid crystalline polyester obtained by cooling and crushing to prepare a pellet-shaped liquid crystalline polyester, and heating the pellet-shaped liquid crystalline polyester. An increase of the molecular weight using these methods is called solid phase polymerization in the technical field. The solid phase polymerization is particularly effective as the method of increasing the molecular weight of the liquid crystalline polyester. It becomes easy to obtain a liquid crystalline polyester having a preferred flow initiation temperature described below by increasing the molecular weight of the liquid crystalline polyester. A heat treatment in the case of the solid phase polymerization is preferably conducted under an inert gas (for example, nitrogen) atmosphere or under reduced pressure, and the heating time is preferably adjusted within a range from 1 to 20 hours. Examples of the apparatus used in the heat treatment include a known dryer, a reactor, an inert oven, a mixer and an electric furnace.

The flow initiation temperature of the liquid crystalline polyester according to the present embodiment is preferably form 270° C. to 400° C., and more preferably from 280° C. to 380° C. by the following reason. That is, when the flow initiation temperature is within such a range, fluidity of the liquid crystalline polyester composition becomes satisfactory, and also heat resistance (solder resistance when a molded body is an electronic component such as a socket) becomes satisfactory. Furthermore, when the flow initiation temperature is within the above range, heat deterioration is less likely to arise upon melt molding so as to obtain a molded body from the liquid crystalline polyester.

In the present embodiment, it is possible to define the flow initiation temperature as the "temperature at which a melt viscosity shows 4,800 Pa·second (i.e., 48,000 poises) when a hot melt of a liquid crystalline polyester is extruded through a nozzle measuring 1 mm in inner diameter and 10 mm in length at a temperature rise rate of 4° C./minute under a load of 9.8 MPa (100 kg/cm$^2$) using a capillary rheometer equipped with the nozzle". Such a definition is known to a person with an ordinary skill in the art as an indicator of a molecular weight of a liquid crystalline polyester (see, for example, edited by Naoyuki Koide, "Synthesis, Molding and Application of Liquid crystalline Polymers", pp. 95-105, CMC, published on Jun. 5, 1987).

<Fibrous Filler>

Although a material of a fibrous filler used in the present embodiment is not particularly limited, it is possible to use, for example, a glass fiber, a silica alumina fiber, an alumina fiber and a carbon fiber. In the present embodiment, it is preferred to use, as the fibrous filler, those having an average fiber diameter of 5 to 20 μm and an average aspect ratio of more than 20 (therefore, a fiber length is 100 μm or more). When the average aspect ratio is 20 or less, crack is likely to occur at a weld portion formed in a molded article (namely, linear streaks formed at the location where two or more flow leading end parts meet each other when a resin is poured into a mold). While warp and crack of a molded article are less likely to occur as the additive amount of a fibrous filler increases, extrudability and moldability deteriorate. In particular, when the additive amount of the fibrous filler is too large, fluidity of a liquid crystalline polyester composition deteriorates, and thus poor filling is likely to occur and also a mechanical strength decreases. In contrast, when the additive amount of the fibrous filler is too small, it is impossible to obtain sufficient resistance to warp and crack. Therefore, when the molded article includes a very thin molded portion (see a minimum thickness portion 201 of FIG. 2), like the present embodiment, the additive amount of the fibrous filler is preferably adjusted within a range from 5 to 80 parts by mass, and more preferably from 10 to 50 parts by mass, based on 100 parts by mass of the liquid crystalline polyester.

<Plate-Like Filler>

Although a material of a plate-like filler used in the present embodiment is not particularly limited, it is possible to use, for example, talc, mica and graphite. Among them, talc and mica are particularly preferred. In the present embodiment, it is preferred to use a plate-like filler having an average particle diameter of 5 μm or more, and more preferably from 10 to 100 μm. When the average particle diameter is less than 5 μm, it becomes impossible to sufficiently suppress orientation peculiar to a liquid crystalline polymer, resulting in large deformation amount of warp. As the additive amount of the plate-like filler increases, warp of a molded article can be reduced, while extrudability and moldability deteriorate. In particular, when the additive amount of the plate-like filler is too large, fluidity of the liquid crystalline polyester composition deteriorates, and thus poor filling is likely to occur and also a mechanical strength decreases. In contrast, when the additive amount of the plate-like filler is too small, it is impossible to obtain sufficient resistance to warp and crack. Therefore, when the molded article includes a very thin molded portion, like the present embodiment, the additive amount of the plate-like filler is preferably adjusted within a range from 5 to 80 parts by mass, and more preferably from 30 to 70 parts by mass, based on 100 parts by mass of the liquid crystalline polyester.

<Granular Filler>

Although a material of a granular filler used in the present embodiment is not particularly limited, it is possible to use, for example, glass beads, glass balloon and carbon black. It is particularly preferred to use, as the granular filler, spherical fillers. Therefore, it is preferred to use, for example, glass beads and glass balloon as the granular filler. In the present embodiment, it is preferred to use a granular filler having an average particle diameter of 5 µm or more, and more preferably from 10 to 100 µm. When the average particle diameter is less than 5 it becomes impossible to sufficiently suppress orientation peculiar to a liquid crystalline polymer, resulting in large deformation amount of warp. As the additive amount of the granular filler increases, warp of a molded article can be reduced, while extrudability and moldability deteriorate. In particular, when the additive amount of the granular filler is too large, fluidity of the liquid crystalline polyester composition deteriorates, and thus poor filling is likely to occur and also a mechanical strength decreases. In contrast, when the additive amount of the granular filler is too small, it is impossible to obtain sufficient resistance to warp and crack. Therefore, when the molded article includes a very thin molded portion, like the present embodiment, the additive amount of the granular filler is preferably adjusted within a range from 5 to 80 parts by mass, and more preferably from 30 to 70 parts by mass, based on 100 parts by mass of the liquid crystalline polyester.

<Other Additives>

It is possible to add common additives, for example, mold release modifiers such as fluororesins and metal soaps; colorants such as dyes and pigments; antioxidants; heat stabilizers; ultraviolet absorbers; antistatic agents; and surfactants; to the liquid crystalline polyester composition of the present embodiment as long as the object of the present invention is not adversely affected. It is also possible to add additives having an external lubricant effect, such as higher fatty acids, higher fatty acid esters, higher fatty acid metal salts and fluorocarbon-based surfactants.

It is also possible to add a small amount of thermoplastic resins such as polyamides, polyesters, polyphenylene sulfides, polyetherketones, polycarbonates, polyphenyleneethers and modified products thereof; polysulfones; polyethersulfones; and polyetherimides; and a small amount of thermosetting resins such as phenol resins, epoxy resins and polyimide resins.

<Mixing Method>

There is no particular limitation on the method of mixing raw components of a liquid crystalline polyester composition according to the present embodiment. It is possible to supply, for example, a liquid crystalline polyester, a fibrous filler, a plate-like filler, a granular filler, and optionally added additives (i.e., above-described mold release agents, heat stabilizers, and the like) to a melt mixer, separately and respectively. It is also possible to supply these raw material components to a melt mixer after preliminarily mixing using a mortar, a Henschel mixer, a ball mill or a ribbon blender. It is also possible to mix pellets prepared by melt-mixing a liquid crystalline polyester and a fibrous filler, pellets prepared by melt-mixing a liquid crystalline polyester and a plate-like filler, and pellets prepared by melt-mixing a liquid crystalline polyester and a granular filler in a desired mixing ratio.

In the present embodiment, a CPU socket shown in FIG. 1 is produced from the liquid crystalline polyester composition obtained by such a mixing method. In the production, for example, an injection molding method can be used.

EXAMPLES

The present invention is described in more detail by following Examples, which should not be construed as a limitation upon the scope of the present invention.

<Production of Liquid Crystalline Polyester>

First, a liquid crystalline polyester was produced using the following two kinds of methods.

(1) First Production Method

First, in a reactor equipped with a stirrer, a torque meter, a nitrogen gas introducing tube, a thermometer and a reflux condenser, 994.5 g (7.2 mol) of parahydroxybenzoic acid as a structural unit $A_1$, 446.9 g (2.4 mol) of 4,4'-dihydroxybiphenyl as a structural unit $C_1$, 299.0 g (1.8 mol) of terephthalic acid as a structural unit $B_1$, and 99.7 g (0.6 mol) of isophthalic acid as a structural unit $B_2$ and 1347.6 g (13.2 mol) of acetic anhydride were charged. Therefore, a molar ratio $(C_1)/(A_1)$ is about 0.3, a molar ratio $[(B_1)+(B_2)]/(C_1)$ is 1.0, and a molar ratio $(B_2)/(B_1)$ is about 0.3.

After the atmosphere inside the reactor was sufficiently replaced with a nitrogen gas, 0.18 g of 1-methylimidazole was added, followed by heating to 150° C. over 30 minutes under a nitrogen gas flow and further refluxing for 30 minutes while maintaining at the same temperature. After adding 2.4 g of 1-methylimidazole, the temperature was raised to 320° C. over 2 hours and 50 minutes while distilling off the by-product acetic acid thus distilled out and the unreacted acetic anhydride. Thereafter, the point in time at which an increase in torque is recognized was considered as completion of the reaction, and contents were taken out.

Subsequently, the solid content thus obtained was cooled to room temperature, crushed by a coarse crusher and then subjected to solid phase polymerization by raising from room temperature to 250° C. over 1 hour under a nitrogen atmosphere, raising from 250° C. to 295° C. over 5 hours and then maintaining at 295° C. for 3 hours.

Finally, the resultant product was cooled to obtain a liquid crystalline polyester (corresponding to LCP1 in Table 1 shown below). A flow initiation temperature of the liquid crystalline polyester obtained by the first production method was 327° C.

(2) Second Production Method

First, in a reactor equipped with a stirrer, a torque meter, a nitrogen gas introducing tube, a thermometer and a reflux condenser, 994.5 g (7.2 mol) of parahydroxybenzoic acid as a structural unit $A_1$, 446.9 g (2.4 mol) of 4,4'-dihydroxybiphenyl as a structural unit $C_1$, 239.2 g (1.44 mol) of terephthalic acid as a structural unit $B_1$, and 159.5 g (0.96 mol) of isophthalic acid as a structural unit $B_2$ and 1347.6 g (13.2 mol) of acetic anhydride were charged. Therefore, a molar ratio $(C_1)/(A_1)$ is about 0.3, a molar ratio $[(B_1)+(B_2)]/(C_1)$ is 1.0, and a molar ratio $(B_2)/(B_1)$ is about 0.7. In the second production method, the molar ratio $(B_2)/(B_1)$ is about two times larger than that in the first production method.

After the atmosphere inside the reactor was sufficiently replaced with a nitrogen gas, 0.18 g of 1-methylimidazole was added, followed by heating to 150° C. over 30 minutes under a nitrogen gas flow and further refluxing for 30 minutes while maintaining at the same temperature. After adding 2.4 g of 1-methylimidazole, the temperature was raised to 320° C. over 2 hours and 50 minutes while distilling off the by-product acetic acid thus distilled out and the unreacted acetic anhydride. Thereafter, the point in time at which an increase in torque is recognized was considered as completion of the reaction, and contents were taken out.

Subsequently, the solid content thus obtained was cooled to room temperature, crushed by a coarse crusher and then subjected to solid phase polymerization by raising from room temperature to 220° C. over 1 hour under a nitrogen atmosphere, raising from 220° C. to 240° C. over 0.5 hour and then maintaining at 240° C. for 10 hours.

Finally, the resultant product was cooled to obtain a liquid crystalline polyester (corresponding to LCP2 in Table 1 shown below). A flow initiation temperature of the liquid crystalline polyester obtained by the second production method was 286° C. and was 41° C. lower than that of the liquid crystalline polyester according to the first method.

(3) Third Production Method

First, in a reactor equipped with a stirrer, a torque meter, a nitrogen gas introducing tube, a thermometer and a reflux condenser, 27.6 g (0.2 mol) of parahydroxybenzoic acid as a structural unit $A_1$, 903.3 g (4.8 mol) of 6-hydroxy-2-naphthoic acid as a structural unit $A_2$, 465.5 g (2.5 mol) of 4,4'-dihydroxybiphenyl as a structural unit $C_1$, 415.3 g (2.5 mol) of terephthalic acid as a structural unit $B_1$ and 1061.7 g (10.4 mol) of acetic anhydride were charged. Therefore, a molar ratio $(C_1)/[(A_1)+(A_2)]$ is 0.5, a molar ratio $(B_1)/(C_1)$ is 1.0.

After the atmosphere inside the reactor was sufficiently replaced with a nitrogen gas, 0.18 g of potassium acetate was added, followed by heating to 150° C. over 30 minutes under a nitrogen gas flow and further refluxing for 60 minutes while maintaining at the same temperature. The temperature was raised to 335° C. over 4 hours and 40 minutes while distilling off the by-product acetic acid thus distilled out and the unreacted acetic anhydride. Thereafter, the point in time at which an increase in torque is recognized was considered as completion of the reaction, and contents were taken out.

Subsequently, the solid content thus obtained was cooled to room temperature, crushed by a coarse crusher and then subjected to solid phase polymerization by raising from room temperature to 240° C. over 1 hour under a nitrogen atmosphere, raising from 240° C. to 300° C. over 5 hours and then maintaining at 300° C. for 7 hours.

Finally, the resultant product was cooled to obtain a liquid crystalline polyester (corresponding to LCP3 in Table 1 shown below). A flow initiation temperature of the liquid crystalline polyester obtained by the third production method was 332° C.

Examples 1 to 4 and Comparative Examples 1 to 3

<Mixing and Molding>

Using each of the liquid crystalline polyesters (LCP1, LCP2 and LP3) obtained by the first, second and third production methods, four samples of Examples and three samples of Comparative Examples were produced as follows.

First, according to the mass composition ratio shown in Table 1, each of the liquid crystalline polyesters (LCP1, LCP2 and LP3) obtained by the first, second and third production methods and fillers were mixed. Using a twin-screw extruder (PCM-30, manufactured by Ikegai Iron Works, Ltd.), the resultant mixture was granulated at a cylinder temperature of 340° C. in Examples 1 to 3 and Comparative Examples 1 to 3 or at a cylinder temperature of 350° C. in Examples 4 to obtain seven kinds of pellet-shaped liquid crystalline polyester compositions. Thereafter, the liquid crystalline polyester compositions thus obtained were respectively molded to produce seven kinds of CPU sockets (see FIG. 1 and FIG. 2) of Examples 1 to 4 and Comparative Examples 1 to 3. The fillers used in the present Example are as follows.

(Fiber Filler)
Glass fiber: CS03JAPX-1 (manufactured by ASAHI FIBER GLASS Co., Ltd.)
(Plate-Like Filler)
Talc: MS-KY (manufactured by NIPPON TALC Co., Ltd.)
Mica: AB-25S (manufactured by YAMAGUCHI MICA Co., Ltd.)
(Granular Filler)
Glass balloon: S60HS (manufactured by SUMITOMO 3M LIMITED)
Glass beads: EGB731 (manufactured by Potters-Ballotini Co., Ltd.)
Carbon black: CB#45 (manufactured by Mitsubishi Chemical Corporation)

<Measurement of Physical Properties>

Next, six kinds of CPU sockets obtained above were subjected to the following evaluation of characteristics.

(1) Amount of Warp

First, the amount of warp of each CPU socket was measured using Coplanarity Measuring Module manufactured by CORES CORPORATION, and an average was calculated using a least squares plane method. In Table 1, this average was described as the amount of warp before reflow.

Next, this CPU socket was subjected to a heat treatment of maintaining at 50° C. for 40 seconds, heating to 270° C., maintaining at this temperature for 1 minute and cooling to 50° C.

With respect to the CPU socket after this heat treatment, the measurement of the amount of warp was carried out again in the same manner as described above, and an average was calculated. In Table 1, this average was described as the amount of warp after reflow.

(2) Crack

Each CPU socket was subjected to a heat treatment at 290° C. for 5 minutes using a hot air circulation oven (manufactured by Tabai Espec Co.) and then the presence or absence of crack was confirmed by observation of appearance of the CPU socket.

(3) Filling Properties

The presence or absence of poor filling was confirmed by observation of appearance of a CPU socket.

The results of the evaluation explained above are shown in Table 1.

TABLE 1

|  | Example 1 | Example 2 | Example 3 | Example 4 | Comparative Example 1 | Comparative Example 2 | Comparative Example 3 |
|---|---|---|---|---|---|---|---|
| LCP 1 (Parts by mass) | 55 | 55 | 55 | 0 | 55 | 55 | 55 |
| LCP 2 (Parts by mass) | 45 | 45 | 45 | 0 | 45 | 45 | 45 |
| LCP 3 (Parts by mass) | 0 | 0 | 0 | 100 | 0 | 0 | 0 |
| Talc (Parts by mass) | 50 | 62.5 | 55.6 | 34.5 | 0 | 0 | 60 |
| Glass fiber (Parts by mass) | 30 | 37.5 | 11.1 | 20 | 100 | 0 | 40 |
| Glass balloon (Parts by mass) | 20 | 0 | 11.1 | 0 | 0 | 0 | 0 |
| Glass beads (Parts by mass) | 0 | 50 | 44.4 | 27.3 | 0 | 100 | 0 |
| Carbon black (Parts by mass) | 2 | 2.5 | 2.2 | — | 2 | 2 | 2 |
| Warp before reflow (mm) | 0.03 | 0.03 | 0.03 | 0.03 | — | 0.04 | 0.04 |
| Warp after reflow (mm) | 0.05 | 0.05 | 0.06 | 0.06 | — | 0.15 | 0.07 |
| Cracks | Good | Good | Good | Good | Good | No Good | No Good |
| Filling properties | Good | Good | Good | Good | No Good | Good | Good |

In Table 1, regarding the evaluation results of crack, the case where no crack was confirmed was rated "Good", whereas, the case where crack was confirmed was rated "No Good". Regarding the evaluation results of filling properties, the case where no poor filling was confirmed was rated "Good", whereas, the case where poor filling was confirmed was rated "No Good".

As is apparent from Table 1, all CPU sockets of Examples 1 to 4 (i.e., CPU sockets made of a liquid polyester composition containing all of a fibrous filler, a plate-like filler and a granular filler) showed a small difference in an amount of warp before and after reflow, and also caused neither crack nor poor filling. To the contrary, CPU sockets of Comparative Examples 1 to 3 (i.e., a CPU socket made of a liquid polyester composition which does not contain any one or more of a fibrous filler, a plate-like filler and a granular filler) showed a large difference in an amount of warp before and after reflow, and also caused crack and poor filling.

As described above, according to the present Example, it was possible to provide a connector which causes a small amount of warp, and is less likely to cause crack and poor filling.

What is claimed is:

1. A liquid crystalline polyester composition comprising a liquid crystalline polyester, a fibrous filler, a plate-like filler and a granular filler, wherein the granular filler has an average particle diameter of 10 to 100 μm.

2. The liquid crystalline polyester composition according to claim 1, in which the fibrous filler is contained in an amount of 5 to 80 parts by mass based on 100 parts by mass of the liquid crystalline polyester.

3. The liquid crystalline polyester composition according to claim 1, in which the plate-like filler is contained in an amount of 5 to 80 parts by mass based on 100 parts by mass of the liquid crystalline polyester.

4. The liquid crystalline polyester composition according to claim 1, in which the granular filler is contained in an amount of 5 to 80 parts by mass based on 100 parts by mass of the liquid crystalline polyester.

5. The liquid crystalline polyester composition according to claim 1, wherein the fibrous filler has an average fiber diameter of 5 to 20 μm and a number average fiber length of 100 μm or more.

6. The liquid crystalline polyester composition according to claim 1, wherein the plate-like filler has an average particle diameter of 10 to 100 μm.

7. The liquid crystalline polyester composition according to claim 1, wherein the liquid crystalline polyester contains 30% by mol or more of the following structure unit:

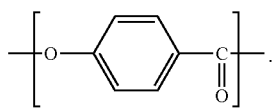

8. A connector formed of the liquid crystalline polyester composition according to claim 1.

* * * * *